United States Patent [19]

Repin

[11] Patent Number: 4,545,907

[45] Date of Patent: Oct. 8, 1985

[54] AERATION TANK

[76] Inventor: Boris N. Repin, Stremyanny pereulok, 17/21, kv. 58, Moscow, U.S.S.R.

[21] Appl. No.: 675,300

[22] Filed: Nov. 27, 1984

[51] Int. Cl.$^4$ ............................................... C02F 3/20
[52] U.S. Cl. .............................. 210/195.1; 210/199; 210/201; 210/205; 210/220
[58] Field of Search .................... 210/624, 625, 195.1, 210/199–202, 205, 207, 209, 220

[56] References Cited

U.S. PATENT DOCUMENTS

| | | | |
|---|---|---|---|
| 3,807,565 | 4/1974 | Langston et al. | 210/203 X |
| 4,069,147 | 1/1978 | Abrams et al. | 210/625 X |
| 4,207,180 | 6/1980 | Chang | 210/220 X |
| 4,246,111 | 1/1981 | Savard et al. | 210/220 X |
| 4,405,456 | 9/1983 | Kinzer et al. | 210/202 X |
| 4,442,005 | 4/1984 | Breider | 210/625 X |

*Primary Examiner*—Thomas Wyse
*Attorney, Agent, or Firm*—Burgess, Ryan & Wayne

[57] ABSTRACT

An aeration tank comprising a mixing vessel having starting and end zones. The mixing tank has water-jet aeration columns and communicates with a sludge separator provided with an outlet of recyclable sludge communicable with a circulation pump connected through a pressure pipe line to the aeration columns. There is also provided a regeneration chamber communicated with the outlet of recyclable sludge of the sludge separator and with the end zone of the mixing vessel, and a chamber for deoxygeneation of the sludge medium having an inlet of waste water and communicating with the regeneration chamber and with the starting zone of the mixing vessel. A suction pipeline of the pump communicates with the chamber for deoxygeneation of the sludge medium and with the starting zone of the mixing vessel. Each aeration column has a converging inlet portion in which the pressure pipeline of the pump having a nozzle is introduced, and an adjacent portion of invariable cross-section accommodating a disperser of oxygen-containing gas. The inlet portion has ports and is provided with a gas-trapping casing immersed in the sludge medium so as to isolate the inlet portion from the outside.

5 Claims, 3 Drawing Figures

AERATION TANK

This invention relates generally to waste water treatment, and more particularly to aeration tanks for biological purification of domestic and industrial sewage water by activated sludge.

The invention can find application for biotreatment of domestic or municipal sewage water within a wide range of its delivery to the sewage treating facilities, especially for purification of sewage water discharged by medium- and large-size dwelling areas.

The invention can also be used in plants for purification of industrial sewage water containing biodecomposable organic contaminants. Most effectively the invention can be employed during biological purification of municipal sewage and industrial process water having high concentrations of organic pollutants when the rate of delivery of such water for purification is erratic, whereas industrial oxygen is available as a side product of the basic technological process.

Aeration tanks are the largest and most power-consuming units in the modern aeration plants. In the aeration tanks-vessels commonly constructed from reinforced concrete - incoming waste water is mixed with activated sludge and subjected to continuous aeration as it travels from the starting treatment zone to the end zone. As a result, aerobic microorganisms populating the activated sludge act to bio-decompose organic pollutants thereby clarifying the water. Subsequent to this, the waste water is separated from the activated sludge, which is returned to the starting treatment zone, and the purification cycle is repeated.

The efficiency of the purification process in aeration tanks, both from the point of view of clarity of the water treated and in terms of providing stable process parameters, is dependent on a number of conditions and factors among which are: composition and properties of waste water, rate of delivery to the aeration tank, concentration of activated sludge in the aeration tank and its functional activity, oxygenation rate, and hydrodynamic conditions in the aeration tank providing for continuity of the critical process parameters at various points of the body of liquid inside the tank. As usual, the flow rate of waste water delivered for aeration fluctuates. Practice has shown that optimized relationship between the concentrations of activated sludge, organic contaminants and dissolved oxygen is rarely maintained, whereby the degree to which the waste water under treatment is purified lacks stability, whereas costs associated with the purification process are relatively high.

Dissolution of oxygen in liquid requires high energy expenditures, because oxygen is a difficulty soluble gas. Factors which determine the rate of oxygen dissolution include: size of the bubbles of oxygen-containing gas, depth of the aeration tank, stirring intensity, length of time provided for gas-to-liquid contact, temperature of the liquid, etc. In practice, each kilogram of dissolved oxygen requires not less than 0.7 to 1 kWh of electric power to be consumed, which can hardly be called efficient and amounts to over 30–40 percent of operating costs necessary for water purification.

There is known an apparatus for purifying predominantly municipal sewage water (cf., French Patent Application No. 248,870; filed Aug. 22, 1980; IPC C 02 F 1/74, F 03 B 13/00). It includes a receiving vessel, a pump for feeding waste water from a collector for the treatment, a mixer of sewage water, and an aeration tank provided with hoods for dispersing industrial oxygen or compressed air, as well as a sludge separator adapted to separate purified waste water from recyclable sludge. Waste water supplied from the receiving vessel is mixed with recyclable sludge, and the thus obtained sludge mixture is admitted to the aeration tank by counterflow relative to ascending bubbles of oxygen-containing gas, whereas the purified waste water is stored in the receiving vessel.

The above apparatus provides for satisfactory purification of only water with low concentration of organic pollutants and delivered to the treating facilities at a substantially uniform rate. In other more common situations the above apparatus would fail to provide for a required degree of purification, since the working concentration of activated sludge in the aeration tank is relatively low, while a means for controlling such a concentration is not provided. Another disadvantage inherent in this apparatus resides in a considerable reduction in the initial activity of the sludge caused by that it tends to be oversaturated with adsorbed organic contaminants and in the lack of provision for regenerating recyclable sludge. In addition, industrial oxygen used for aerating the sludge medium inevitably escapes to the atmosphere. Taking into account the costs associated with producing industrial oxygen, the purification of waste water in this apparatus is quite expensive.

There is also known an apparatus for purifying waste water comprising an aeration tank and a sludge separator for separating purified waste water from recyclable sludge (cf., West German Patent Application No. OS 3,045,158; Cl. C 02 F 3/12). The aeration tank is divided into three zones. The starting zone, which is provided with a pipeline for feeding waste water, has a pressure-sealed partition on which are disposed a stirrer and two recirculation blowers, one such blower serving to supply to a disperser underlying the stirrer outgoing gases for reuse in the initial or starting zone, the other blower directing the outgoing gases to the disperser arranged under the stirrer in the second, or intermediate zone communicating with the atmosphere. In the third or end zone connected to the sludge separator aeration is carried out by means of a vertical or upright mechanically-operated aerator functioning to maintain the activated sludge in suspended state and introduce added quantities of dissolved oxygen due to an extensive surface contact between the sludge medium and atmospheric air.

The aforedescribed device assures high rates of dissolution of oxygen in the sludge medium, although fails to provide for necessary rates of its consumption, since the working concentration of activated sludge in the aeration tank is relatively low. During an influx of sewage water delivered for purification, when the activated sludge is subject to higher loads, the functional capabilities of aerobic microorganisms are temporarily affected, whereby the quality of waste water purification becomes poorer and the activated sludge loses its capacity to settle in the sludge separator. In addition, the pressure-sealed partition above the starting treatment zone fashioned as a load-carrying structure is quite complex both in erection and operation. Reuse of the outgoing gas accumulating under the pressure-sealed partition likewise fails to produce an appreciable advantage, since the outgoing gas contains, apart from unused process oxygen, over 50% of carbon dioxide resulting from the activity of microorganisms populating the activated sludge. Increased percentage of carbon dioxide in the sludge medium, which is inevitable during reuse of the outgoing gas, suppresses the activity of microorganisms and negatively affects the quality of waste water treatment.

There is further known an aeration tank comprising a mixing vessel provided with water-jet aeration columns and having a starting zone accomodating inlets for feeding waste water and activated sludge to the mixing vessel, and an end zone in which there is disposed an outlet of sludge medium communicable with a thin-layer sludge separator adapted to separate recyclable sludge from the sludge medium and having an outlet of recyclable sludge connected to a suction pipe of a circulation pump having a pressure line thereof connected to the water-jet aeration columns (of., USSR Inventor's Certificate No. 920,005; IPC C 02 F 3/12).

The use of the sludge separator with a thin-layer filler makes it possible, at large amounts of recyclable sludge, to continuously maintain an increased concentration of activated sludge of up to 6–8 g/l in the mixing vessel.

However, maintaining high concentrations of activated sludge during reduced waste water supply for purification tends to result in an increase in non-productive consumption of the oxygen of the air for autooxidation of the activated sludge, which in conjunction with the aeration columns entraining the atmospheric air by a free-falling liquid jet and requiring large amounts of recyclable sludge to be pumped, causes considerable overexpenditures of electric power.

The lack in the above aeration tank of means for regenerating activated sludge the sorbtion capacity of which is temporarily affected as a result of removal from the waste water of some organic contaminants makes it impossible to sufficiently utilize the oxidation capacity of microorganisms. Therefore, in order to avoid deterioration in the quality of the waste water being purified, it is necessary to increase the interior of the mixing vessel by 2 to 3 times.

The flow of recyclable sludge falling by gravity from the aeration columns has a rather low mixing capacity. Therefore, in order to avoid stagnation zones in the mixing vessel of the aeration tank, and prevent sludge deposition zones, the working depth of the sludge medium must not exceed 2 m, which results in increased size of the apparatus in plan, requires more floor area, and causes thermal losses in the cold time of year. The operation of axial-flow pumps sucking-in recyclable sludge from the sludge separator and waste water from a distribution through during fluctuating flow of waste water delivered for purification is unstable to cause sporadic variations in the concentration of activated sludge in the mixing vessel.

It is therefore an object of this invention to obviate the disadvantages of the prior art aeration tanks, particularly to provide for complete and stable biotreatment of waste water when the incoming flow of waste water and concentration of organic pollutants therein fluctuate considerably.

Another object is to substantially reduce the working interior of an aeration tank and make it possible to maintain a high degree of purification of waste water.

One more object is to substantially reduce unproductive expenditures of electric power required for aeration in the course of waste water purification.

The objects and other attending advantages of the invention are attained by that in an aeration tank comprising a mixing vessel provided with water-jet aeration columns having a starting zone in which there are disposed inlets for admitting waste water and activated sludge to the mixing vessel, and an end zone having an outlet of sludge medium communicating with a thin-layer sludge separator for separating recyclable sludge from the sludge medium and provided with an outlet of purified waste water, and an outlet of recyclable sludge connected to a suction pipe of a circulation pump a pressure pipeline of which is connected to the water-jet aeration columns. According to the invention, the mixing vessel has dispersers of compressed air, whereas the aeration tank is provided with intercommunicating chambers for regeneration and deoxygenation of the sludge medium also having dispersers of compressed air, the regeneration chamber communicating with the outlet of recyclable sludge and having an inlet of sludge medium communicable with the end zone of the mixing vessel, the deoxygenation chamber having an inlet for feeding sludge water thereto and an outlet communicating with the starting zone of the mixing vessel in which there are disposed the water-jet counterflow-type aeration columns, each of these columns having in its upper section a converging inlet portion to which there is introduced the pressure pipeline of the circulation pump provided with a nozzle, and an expanding or diverging outlet portion disposed in the lower section thereof, these two portions being connected by a portion of invariable cross-section which accommodates a disperser of oxygen-containing gas, the inlet portion having ports with a gas-trapping isolating casing secured on the pressure pipeline of the circulation pump so that its free edge is immersed in the sludge medium thereby separating the inlet portion from the outside, whereas a suction pipe of the circulation pump has two branches, one branch being communicated with the chamber for deoxygenation of the sludge medium, while the other branch communicates with the starting zone of the mixing vessel.

The use of the chambers for regenerating and deoxygenating the sludge medium enables firstly to recuperate the initial properties of the activated sludge in an efficient manner, and then to preliminarily reduce the concentration of dissolved oxygen in the sludge medium prior to its delivery for aeration by virtue of a short-duration retension in the deoxygenation chamber to which part of the incoming waste water is fed. The preliminary deoxygenation of the sludge mixture prior to its delivery by the circulation pumps to the water-jet aeration columns is 1.5 to 2 times the extent of its saturation with oxygen during aeration, which facilitates a more efficient use of the oxygen-containing gas.

The employment of water-jet aeration columns with the upper section thereof having introduced thereto the pressure pipe of the circulation pump ending in a nozzle and the bottom section accommodating a diverging outlet portion enables to carry out counterflow aeration, when bubbles of oxygen-containing gas tend to grow smaller in diameter and loose their initial floating capacity to gradually travel downwards and terminate the process of mass transfer of oxygen to the liquid. This increases severalfold the time of gas-to-liquid contact, which in turn substantially improves the extent to which oxygen is utilized.

The provision of the gas-trapping casing secured on the pressure pipe of the circulation pump so that its free edge is immersed in the sludge medium in conjunction with ports in the inlet portion of the counterflow-type aeration columns makes it possible to trap the finest bubbles of undissolved gas carried away from the columns to thereby effect recuperation by ejecting the gas accumulated under the casing through the ports. This in turn enables to minimize losses of oxygen-containing gas to the atmosphere, and in the case of using industrial or process oxygen to attain practically a loss-free utilization thereof.

The division of the suction pipeline into two branches one of which communicates with the chamber for regenerating activated sludge through the chamber for deoxygenation of the sludge medium, while the other communicates with the starting zone of the mixing tank ensures a 2 to 3 times increase in the concentration of activated sludge in the mixing vessel during growing process loads, and enables to control the concentration of dissolved oxygen in the starting treatment zone of the mixing vessel subject to the greatest process loads. This provides for a thorough and stable biotreatment of waste water thanks to maintaining an optimized ratio between the concentration of activated sludge and that of organic contaminants.

Preferably, the largest cross-sectional area of the outlet portion of the counterflow-type water-jet aeration column is 2 to 5 times the cross-sectional area of the portion of invariable cross-section.

In the course of mass transfer of oxygen to the liquid bubbles of oxygen-containing gas floating in the liquid counterflow tend to become smaller in size. Accordingly, their floating capacity is reduced 2 to 5 times whereby they travel downwards toward the bottom section of the water-jet aeration column. In order to extend gas-to-liquid contact promoting dissolution of oxygen, the outlet portion of each of the counterflow-type water-jet aeration columns has the form of a flare having a taper of between 1:2 and 1:5. This enables to practically equalize the flow speed of the sludge mixture at any section of the aeration column with the floating capacity of the gas bubbles in the course of dissolution of oxygen and reduction of bubbles size to 1 mm. When bubble size is less than 1 mm across, circulation of oxygen inside the bubble becomes less pronounced, and the rate of mass transfer drops. Therefore, the taper of the flaring outlet portion of the column in excess of 1:15 is not recommended.

When the water-jet aeration columns are fed with an outside air or air not sufficiently enriched with industrial oxygen, the size of gas bubbles is reduced by not more than 1.5 times even at a substantial oxygen depletion in the gas medium. It is therefore recommended for such cases that the taper of the flaring outlet portion must be 1:2.

Advisably, the free edge of the isolating casing has a diameter 1.5 to 3 times the diameter of the outlet portion.

Fine bubbles of oxygen-containing gas carried through the diverging outlet portion of the water-jet aeration columns are raised by the flow of recyclable sludge medium upwards for the thus liberated gas to accumulate under the isolating casing. The ascent of fine bubbles is most vigorous in an annular area surrounding the water-jet aeration column and exceeding by 1.5 to 3 times the diameter of the outlet portion. This in turn makes it possible to trap and subsequently recuperate virtually all the oxygen-containing gas which failed to dissolve in the sludge medium.

Preferably, the length of the diverging outlet portion is from 0.5 to 0.75 the entire length of the aeration column.

This condition provides for a smooth or gradual hydraulic connection between the portion of invariable cross-section and the diverging outlet portion, as well as facilitates distribution of gas bubbles of different diameters throughout the height of the column, which prevents the escape of large-size bubbles outside the column.

It is further recommended that the outlet portion be provided with at least one jet-guiding perforated tapered hood arranged concentrically with the outlet portion and having the same taper as the outlet portion.

The use of such a jet-guiding tapered hood of the same conicity as the outlet portion facilitates the provision in the column of several annular counterflow gas-liquid streams to ensure uniform distribution of gas bubbles across the column. Perforations, such as holes or slots, in the hood promote transverse circulation of gas bubbles in the column thanks to overflow of the sludge medium through the perforations as it moves in the downward direction. This ensures a uniform and more complete saturation by dissolved oxygen of preliminary deoxygenated sludge medium during its passage through the water-jet aeration columns.

In view of the foregoing, the proposed construction of an aeration tank makes it possible to provide for a more complete and stable purification of municipal and industrial sewage water regardles of the fluctuations in the delivery rate of such water for purification, as well as to considerably reduce capital and operating costs involved.

The invention will now be described in greater detail with reference to various preferred embodiments thereof taken in conjunction with the accompanying drawings, in which.

Figure 1:
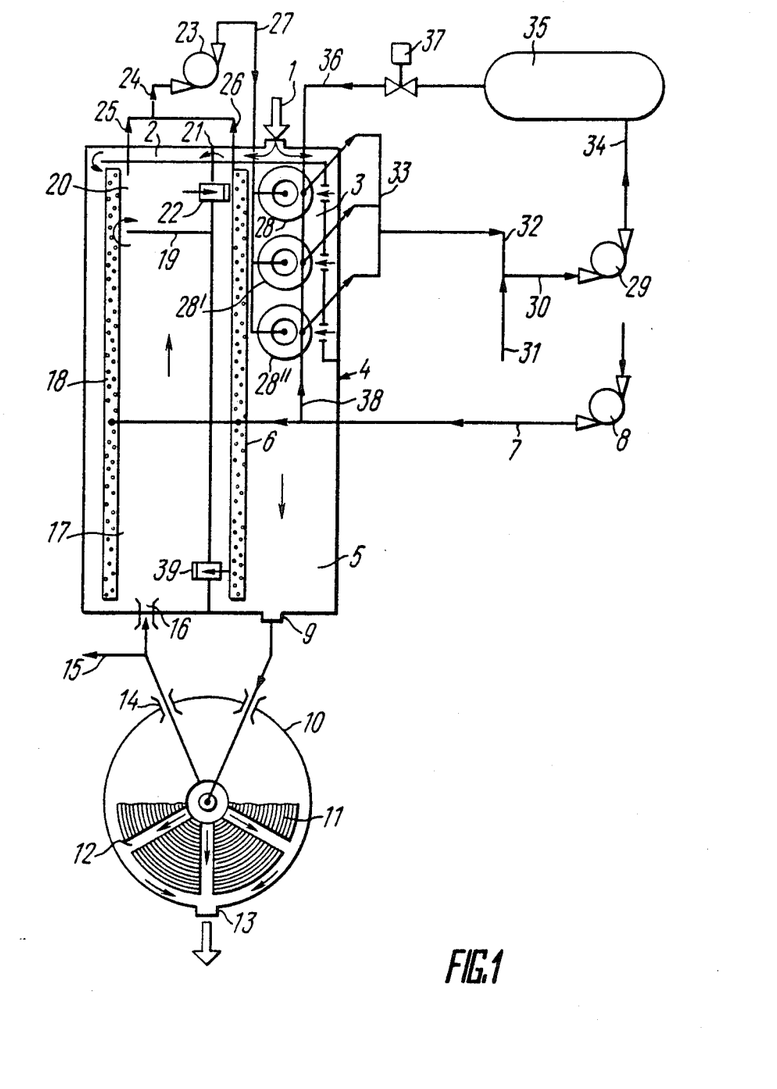
FIG. 1 is a top plan view of an aeration tank according to the invention.

With reference to FIG. 1, the aeration tank according to the invention comprises an inlet of sewage water indicated by 1 in the form of a distribution chute 2 disposed in a starting zone of a mixing vessel 4. The distribution chute 2 is provided with adjustable holes.

Dispersers 6 connected to a compressed air pressure line 7 of an air blower 8 are layed between an end zone 5 and the starting zone 3 on the bottom of the mixing vessel 4. In the end zone 5 there is disposed an outlet 9 of sludge medium communicating with a thin-layer sludge separator 10 accommodating a thin-layer module 11 and a system of collecting chutes 12 connected to an outlet 13 of purified waste water. The thin-layer sludge separator 10 is also provided with an outlet 14 of recyclable sludge communicated with an excess sludge pipe 15 and an inlet 16 of recyclable sludge to a regeneration chamber 17 having a disperser 18 connected to a pressure line 7 of compressed air.

The regeneration chamber 17 is separated by a baffle plate 19 from an adjacent chamber 20 for deoxygenation of the sludge medium.

The inlet system of the waste water 1 in the form of the distribution chute 2 is provided with an overflow crest 21 separating part of the distribution chute 2 occupying the deoxygenation chamber 20 from a section of the distribution chute 2 disposed in the starting zone 3 of the mixing vessel 4.

The chamber 20 for deoxygenation of the sludge medium is provided with an outlet in the form of a non-return valve 22.

The proposed aeration tank has a circulation pump 23, a suction pipe 24 of which is connected by one branch 25 thereof to the chamber 20 for deoxygenation of the sludge medium, and by another branch 26 to the starting zone 3 of the mixing vessel 4.

A pressure line 27 of the circulation pump 23 is connected to the upper portion of water-jet aeration columns 28, 28' and 28" of the counterflow type installed in the starting zone 3 of the mixing vessel 4.

The aeration tank is further provided with a feeder 29 of oxygen-containing gas, a suction pipe 30 of which has two branches; one branch 31 communicating with a source of initial oxygen-containing gas, whereas the other branch 32 is connected to a pipe 33 of recuperable oxygen-containing gas communicating with the columns 28.

A pressure line 34 of the feeder 29 of oxygen-containing gas communicates with a receiver 35 having a distribution pipe 36 thereof provided with a control valve 37 communicated by way of by-pass 38 with the compressed air line 7, this pipe 36 being connected to the aeration columns 28, 28', 28".

The end zone 5 of the mixing vessel 4 communicates with the regeneration chamber 17 by a sludge medium inlet in the form of a non-return valve 39 structurally similar to the non-return valve 22 but disposed in a reverse manner.

Each of the counterflow-type water-jet aeration columns 28 (FIG. 2) has in its upper section a converging inlet portion 40 to which is fitted the pressure pipe 27 of the circulation pump 23 provided with a nozzle 41, the column 28 also having in its bottom section a diverging outlet portion 42, these portions being connected therebetween by a portion 43 of continuous or invariable cross-section accommodating a disperser 44 of oxygen-containing gas. The inlet portion 40 is provided with ports 45 and a gas-trapping isolating casing 46 secured on the pressure line 27 of the circulation pump 23 so that its free edge 47 is immersed in the sludge medium thereby acting to isolate the inlet portion from the outside air.

Figure 2:
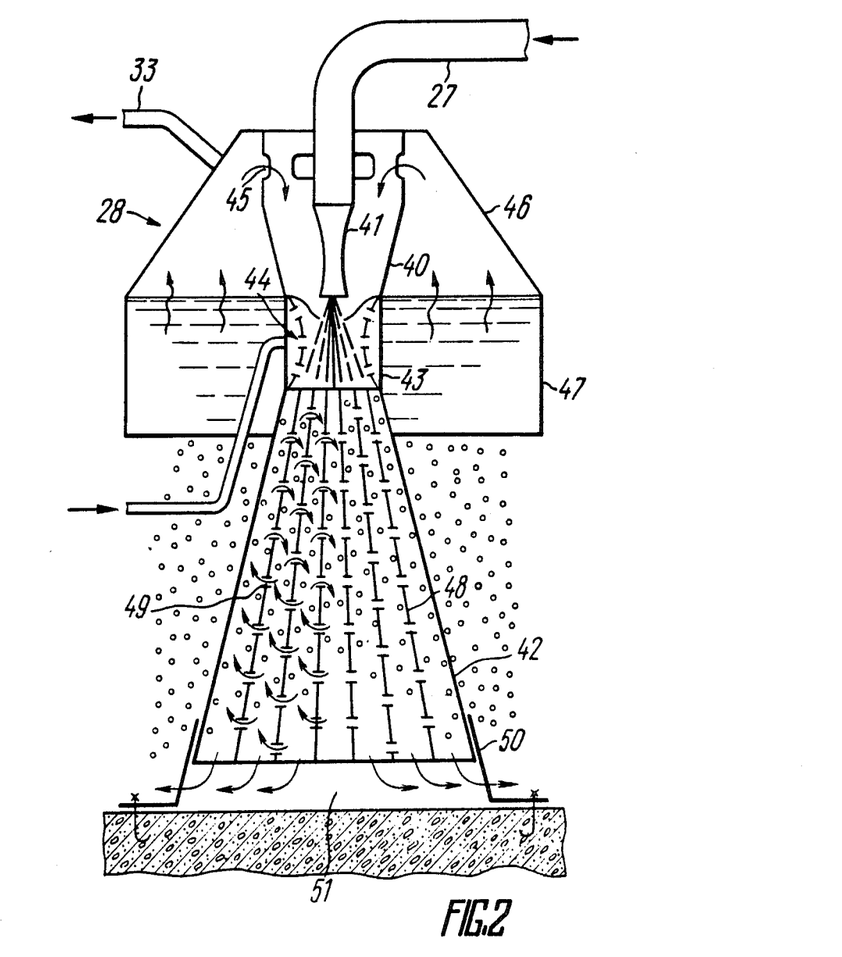
FIG. 2 shows one unit of a counterflow-type water-jet aeration column.

The outlet portion 42 of the column 28 has at least one jet-guiding perforated tapered hood 48 provided with holes or slots 49, arranged concentrically relative to the outlet portion 42, and having the same taper as that of the outlet portion 42.

The water-jet aeration column 28 (as well as the columns 28' and 28") is secured on supports 50 so that the lowest edge of its outlet portion defines with the bottom of the mixing vessel a circulation slot 51.

Referring again to FIG. 1, the operation of the aeration tank involves the following process procedures. The waste water 1 is admitted through the inlet in the form of the distribtuion chute 2 to the starting zone 3 of the mixing vessel 4 whereto regenerated and preliminarily deoxygenated activated sludge is fed through the inlet means in the form of the non-return valve 22. The thus obtained sludge medium flows by gravity from the starting zone 3 of the mixing vessel 4 to its end zone 5, being subjected in the course of its travel to aeration by compressed air supplied by the air blower 8 having the pressure line 7 thereof connected to the disperser 6.

During the travel of the sludge mixture aerobic microorganisms of the activated sludge act to biologically decompose the organic pollutants carried by the waste water oxidizing them to carbon dioxide, water, gaseous nitrogen, nitrates and nitrites.

From the end zone 5 of the mixing vessel 4 the sludge medium is conveyed through the outlet 9 to the thin-layer sludge separator 10 capable of separating recyclable sludge, from the sludge medium, the separator 10 being provided with the thin-layer module 11, a system of collecting chutes 12, and having the outlet 13 of purified water and outlet 14 of recyclable sludge.

As the sludge medium moves along the annular passages of the thin-layer module 11 arranged inside the sludge separator 10, a vigorous separation of recyclable sludge from the purified waste water takes place. Therewith, the recyclable sludge tends to settle on the inclined inner surfaces of the thin-layer module to thereafter slide to the lower settling portion of the sludge separator 10, whereas the cooled and clarified waste water flows over to the system of collecting chutes 12.

The recyclable sludge from which the excess sludge 15 is evacuated is conveyed through the inlet 16 to the regeneration chamber 17 provided with the disperser 18 connected to the pressure line 7 of the air blower 6. The flow of regenerated activated sludge is conveyed, while passing about the adjacent baffle 19, from the chamber 17 to the chamber 20 for preliminary deoxygenation of the sludge medium, wherefrom it is returned to the starting zone 3 of the mixing vessel 4 through the inlet in the form of the non-return valve 5, upon which the cycle of purifying the waste water 1 from organic contaminants is recommenced.

When the influx of the waste water 1 is increased, particularly when its level in the distribution chute 2 is in excess of the level of the overflow crest 21, part of the sewage water 1 is conveyed through the inlet 2 to the chamber 20 for preliminary deoxygenation of the sludge medium. In the chamber 20 partially isolated from the regeneration chamber 17 by the adjacent baffle partition 19, the rate of consumption of oxygen by the activated sludge tends to grow sharply, due to which the concentration of dissolved oxygen approximates zero, that is the regenerated sludge medium becomes deoxygenated.

At the same time, the circulation pump 23 is energized either by remote control or automatically, the suction line 24 of which pump 23 having two branches with one of the branches, particularly branch 25 communicating with the chamber 20 for deoxygenation of the regenerated sludge medium, while the other— branch 26—communicates with the starting zone 3 of the mixing vessel 4. As a result, the sludge mixture having a minimal amount of dissolved oxygen flows along the pressure line 27 of the circulation pump 23 to the water-jet aeration columns 28, 28' and 28".

The feeder 29 of oxygen-containing gas forces the oxygen-containing gas along the pipe 34 to the receiver 35, the suction pipe 30 of this feeder 29 having two branches one of which, particularly branch 31 communicates, for example, with a source of industrial oxygen or with a unit for enriching the outside air with oxygen, whereas the other, branch 32, communicates with the pipe 33 of recuperable oxygen-containing gas. The delivery of industrial oxygen or oxygen-enriched air to the receiver 35 may take place at any time of day, for example, during a height-hours decrease in the electric power consumption, while the recuperable oxygen-containing gas is supplied to the receiver 35 only during operation of the water-jet aeration columns 28.

As a result of remote-control or automatic opening of the control valve 37, the oxygen-containing gas flows in the distribution pipe 36 to enter the water-jet aeration columns 28, 28' and 28" where vigorous mass transfer of oxygen to the sludge medium takes place in the counterflow of liquid and gas.

In some instances, for example when a sudden inflow of waste water is characterized by low concentration of organic pollutants to be accompanied by relatively negligeable increase in the process loads, it is preferable to feed to the aeration water-jet columns 28, 28' and 28" compressed air rather than oxygen-containing gas, this air being supplied along the by-pass 38 connected with the pressure line 7 of the air blower 8.

At the moment when the circulation pump 23 is energized and when pumping of the sludge medium from the chamber 20 for deoxygenation of the sludge medium and the regeneration chamber 17 communicable therewith to the aeration columns 28 and thereafter to the starting zone 3 of the mixing vessel 4 starts, the non-return valve 22 shuts under the action of a hydrostatic difference in the levels and the inlet of the sludge medium in the form of the non-return valve 39 communicating with the end zone 5 of the mixing vessel 4 opens.

Therewith, the flow of sludge medium saturated with dissolved oxygen having a concentration of activated sludge of about 1-2 g/l is conveyed from the end zone 5 of the mixing vessel 4 to the regeneration chamber 17, wherefrom the sludge medium having a concentration of activated sludge of between 6 and 10 g/l is conveyed by the circulation pump 23 to the starting zone 3 of the mixing vessel 4. As a result of such mixing, the concentration of activated sludge in the mixing vessel 4 is increased from 1-2 g/l to 3-6 g/l, which makes it possible to maintain in the sludge medium an optimum ratio between the concentration of activated sludge and concentration of organic pollutants during increased inflow of the waste water 1, as well as to provide favourable hydrodynamic conditions for averaging and balancing the concentrations of reactive media in practically all locations throughout the volume of the aeration tank.

A more precise adjustment of the hydrodynamic structure of the sludge medium flow, working concentrations of the activated sludge and amount of oxygen being introduced controlled, for example, by monitors of dissolved oxygen installed in the end zone 5 of the mixing vessel 4 is assured by varying the pipe capacity of the branches 25 and 26 of the circulation pump 23, the degree of opening of the control valve 37, as well as by varying the number of simultaneously operating water-jet aeration columns 28, 28' and 28".

The advantageous economic effect resulting from the use of process oxygen or air enriched with process oxygen for aerating waste water is determined to a considerable degree by the efficiency of its application. In order to bring its use to the optimum, each of the counterflow-type water-jet aeration columns 28, 28' and 28" (FIG. 2) has the converging inlet portion 40 accommodating the pressure line 27 of the circulation pump 23 provided with the nozzle 41 and disposed in the bottom section the diverging outlet portion 42, these portions being interconnected by a portion 43 of substantially invariable cross-section in which there is disposed the disperser 44 of oxygen-containing gas connected to the pipe 37, the inlet portion 40 being provided with ports 45 and gas-trapping isolating casing 46 secured on the pressure line 27 of the circulation pump 23 so that its free edge 47 is immersed in the sludge medium thereby separating the inlet portion 40 from the outside air.

The aeration water-jet column operates as follows.

Upon actuation of the circulation pump 23 the preliminarily deoxygenated sludge medium flows at an overpressure along the pipe 27 through the nozzle 41 to the portion 43 of invariable cross-section.

Simultaneously, oxygen-containing gas is introduced through the control valve 37 along the pipe 36 through the disperser 44, the bubbles of this gas being broken by a jet of sludge medium into finer bubbles of various size to be entrained toward the expanding outlet portion 42 of the column. With the gas bubble diameter rather small and the speed of ascent being determined mostly by the buoyancy force, which is less then the speed of vertical travel of the sludge medium in cross-section of the column, the bubbles tend to move in a counterflow direction downwards. As the cross-sectional area of the diverging outlet portion 42 increases, the speed of vertical travel of the sludge medium is gradually reduced and at the point when it equals the free ascent speed of the bubble, the latter stops its movement downwards to float at a substantially invariable height.

If the gas bubble contains a sufficient amount of oxygen, then due to the dissolution of oxygen in the sludge medium its size will tend to grow noticeably smaller for the velocity of the free ascent of the bubble to reduce and the vertical flow of liquid to move it toward the bottom of the expanding outlet portion 42.

Figure 3:
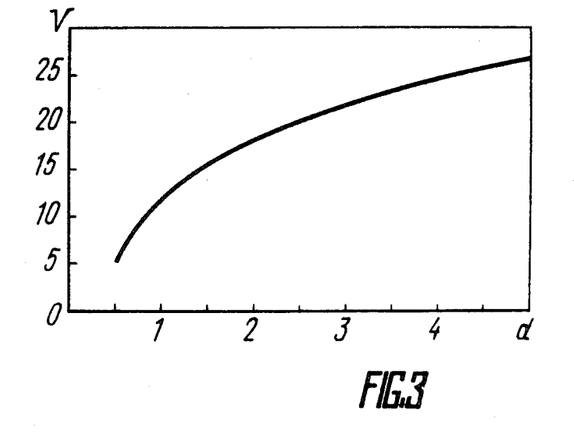
FIG. 3 represents a dependence of the velocity V of the free ascent of the bubbles of oxygen-containing gas on their diameter d.

The experimental dependence of the velocity V, in cm/s (plotted on the ordinate) of the free ascent of the bubbles of oxygen-containing gas on their diameter d, in mm, (plotted on the abscissa) is represented in FIG. 3. The rate of mass transfer of oxygen to the liquid from bubbles having a diameter less than 0.5 mm drops sharply due to a somewhat less vigorous circulation of gas inside the bubbles. Considering the fact that the optimum size of gas bubbles ranges from 0.5 to 6 mm, which corresponds to a variation in the free ascent velocities of substantially from 25 cm/s to 5 cm/s, the best results of the counterflow dissolution of oxygen are attained when the largest cross-sectional area of the outlet portion 42 is two to five times the cross-sectional area of the portion of invariable cross-section.

While being in the diverging outlet portion 42 of the water-jet aeration columns 28, 28' and 28", the bubbles of oxygen-containing gas are subject to two opposite processes of breaking and coalescence. This occurs not only at the point of formation of gas bubbles at the surface of the disperser 44 and their entrainment by the jet of sludge medium, but also in the course of floating of the bubbles of equal size at an invariable level, when the adjacent bubbles collide, stick together and coalesce. The product of such coalescence—bubbles of large size having a substantial free ascent velocity-rush upwards toward the portion 43 of invariable cross-section where the jet of sludge medium acts to break them into multiple smaller bubbles and return them again to the expanding outlet portion 42. The breaking of large-size bubbles into finer bubbles is accompanied by additional abrupt increase in the rate of mass transfer of oxygen to the sludge medium thanks to the fast (approaching the speed of sound) formation of new interface between gas and liquid. The proposed construction of aeration water-jet column 28, where the process of mass transfer of oxygen to the liquid is intensified thanks to the preliminary deoxygenation of the sludge medium, the use of counterflow between liquid and oxygen-containing gas, breaking up and coalescence of gas bubbles, and extension in the time of gas-to-liquid contact makes it possible to envigorate the rate of dissolution of oxygen severalfold and increase the extent of its utilization.

The flow of sludge medium saturated with dissolved oxygen entraining the finest bubbles of oxygen-containing gas is conveyed through the circulation slot 51 to the starting zone of the mixing vessel 4. In a diameter exceeding 1.5 to 3 times the largest diameter of the outlet portion of the flow speed of the sludge medium is reduced to such an extent that the fine bubbles of oxygen-containing gas start to ascend, which is accompanied by extra dissolution of oxygen in the sludge medium of the starting zone 3 of the mixing vessel 4, whereas the liberated gas collects under the gas-trapping isolating casing 46. As a result of the ejecting effect of jet escaping from the nozzle 41, in the interior of the gas-trapping casing 46 the free edge of which is immersed in the sludge medium to form a hydraulic seal the oxygen-containing gas again becomes involved in the diverging outlet portion 42 of the column 28 through the ports 45. Because the amount of oxygen-containing gas accumulated under the gas-trapping casing 46 may be in excess of the amount of gas ejectable from the ports 45 the pipe 33 may serve for periodic withdrawal and feeding the oxygen-containing gas by the feeder 29 to the receiver 35.

The use of the gas-trapping casing 46 and other elements of the water-jet column 28 associated with its operation practically prevents the escape of oxygen to the atmosphere. Such an arrangement is especially efficient when used for aeration of the sludge medium is an oxygen-containing gas having, for example, an increased, such as over 50%, content of industrial oxygen, which is rather costly to produce.

One condition for efficient operation of the counterflow-type water-jet aeration column 28 resides in a uniform distribution of the bubbles of oxygen-containing gas across the diverging outlet portion 42. This condition is met in that the length of the diverging outlet portion 42 amounts to from 0.5 to 0.75 the length of the aeration column. Normally, the depth of sludge medium in the mixing vessel 4 of the aeration tank is within 3 to 6 m. In consequence, the length of the diverging outlet portion 42 will be 2 to 4.5 m to provide with the ratio of the minimum and maximum diameters of the aeration tank 28 of 1:5 for alignment in the vertical velocities and ensure the absence of swirling and stagnating zones.

However, the compliance with the above condition is not sufficient in cases when the flow rate of oxygen-containing gas delivered along the pipe 37 connected to the disperser 44 is close to its maximum value. Substantial amounts of oxygen-containing gas may therefore tend to accumulate in the upper section of the diverging outlet portion 42 to affect mass transfer. In order to avoid such a situation at any flow rate of oxygen-containing gas, the outlet portion 42 is provided with at least one tapered perforated jet-guiding hood 48 arranged concentrically with the outlet portion 42 and having the same taper as the outlet portion 42 (FIG. 2). Therewith, the vertical flow of sludge medium moves in a downward direction along the annular concentric passages to reduce the effect of crosswise circulation at the outlet portion 42 of the column 28. The gas bubbles which have grown larger in size due to the coalescence and tend to move upwards are entrained through the holes 49 or slots in the hood 48 by transverse jets of the sludge medium to the adjacent annular passages to result in extension of gas-to-liquid contact by 1.3 to 1.5 times and provide for a high dissolution rate of oxygen under any operating conditions. FIG. 2 shows for the sake of simplicity the transverse circulation of gas bubbles only on the left half of aeration column.

In view of the foregoing, the proposed invention makes it possible to ensure a stable and complete biological treatment of waste water under considerable fluctuations in the flow and concentration of organic pollutants. It also enables to drastically reduce the working interior of the aeration tank and power expenditures required for aeration while providing for a high degree of water purification.

What is claimed is:

1. An aeration tank comprising:
    a mixing vessel having a starting zone and an end zone;
    counterflow-type water-jet aeration columns disposed in the starting zone of said mixing vessel;
    inlet means for admitting to said mixing vessel waste water and activated sludge, this means being disposed in the starting zone of said mixing vessel;
    an outlet of sludge medium disposed in the end zone of said mixing vessel;
    a thin-layer sludge separator adapted for separating recyclable sludge and sludge water from the sludge medium and having an inlet connected to said outlet of the mixing vessel for feeding sludge medium thereinto, and outlets of waste water and recyclable sludge;
    dispersers of oxygen-containing gas disposed in said mixing vessel;
    a chamber for regenerating sludge medium communicable with the outlet of recyclabe sludge of said sludge separator and with the end zone of said mixing vessel;
    dispersers of oxygen-containing gas disposed in said regeneration chamber;
    a chamber for deoxygenation of sludge medium communicable with said regeneration chamber and having an inlet for admitting waste water thereto and an outlet communicable with the starting zone of said mixing vessel;
    dispersers of oxygen-containing gas disposed in said deoxygenation chamber;
    a circulation pump;
    a suction pipe of said circulation pump having two branches, one of the branches communicating with the starting zone of said mixing vessel, the other communicating with said chamber for deoxygenation of sludge medium;
    a pressure line of said circulation pump connected to said aeration columns;
    a nozzle secured on said pressure line of said circulation pump;
    said aeration columns having each:
    a converging inlet portion in an upper section of said aeration column, fitted to this portion being said pressure pipeline of said circulation pump provided with the nozzle;
    a diverging outlet portion in a lower section of said aeration column;
    a portion of continuous cross-section interposed between said inlet and outlet portions;
    a disperser of oxygen-containing gas disposed in said portion of continuous cross-section;
    ports provided in said outlet portion;

gas-trapping isolating casing secured on said pressure pipeline of said circulation pump so that its free end is immersed in sludge medium to isolate said inlet portion from the outside;

at least one source of oxygen-containing gas communicating with said dispersers of oxygen-containing gas.

2. An aeration tank as defined in claim 1, in which the largest cross-sectional area of the outlet portion is 2 to 5 times the cross-sectional area of the portion of continuous cross-section.

3. An aeration tank as defined in claim 2, in which a free edge of said isolating casing has a diameter 1.5 to 3 times the largest diameter of the outlet portion.

4. An aeration tank as defined in claim 3, in which the length of said diverging outlet portion is between 0.5 and 0.75 times the length of the entire aeration column.

5. An aeration tank as defined in claim 4, in which said outlet portion is provided with at least one jet-guiding tapered perforated hood arranged concentrically with said outlet portion and having the same taper as said outlet portion.

* * * * *